Nov. 3, 1970    R. K. HARRIS    3,537,188
DRYER
Filed Feb. 25, 1969
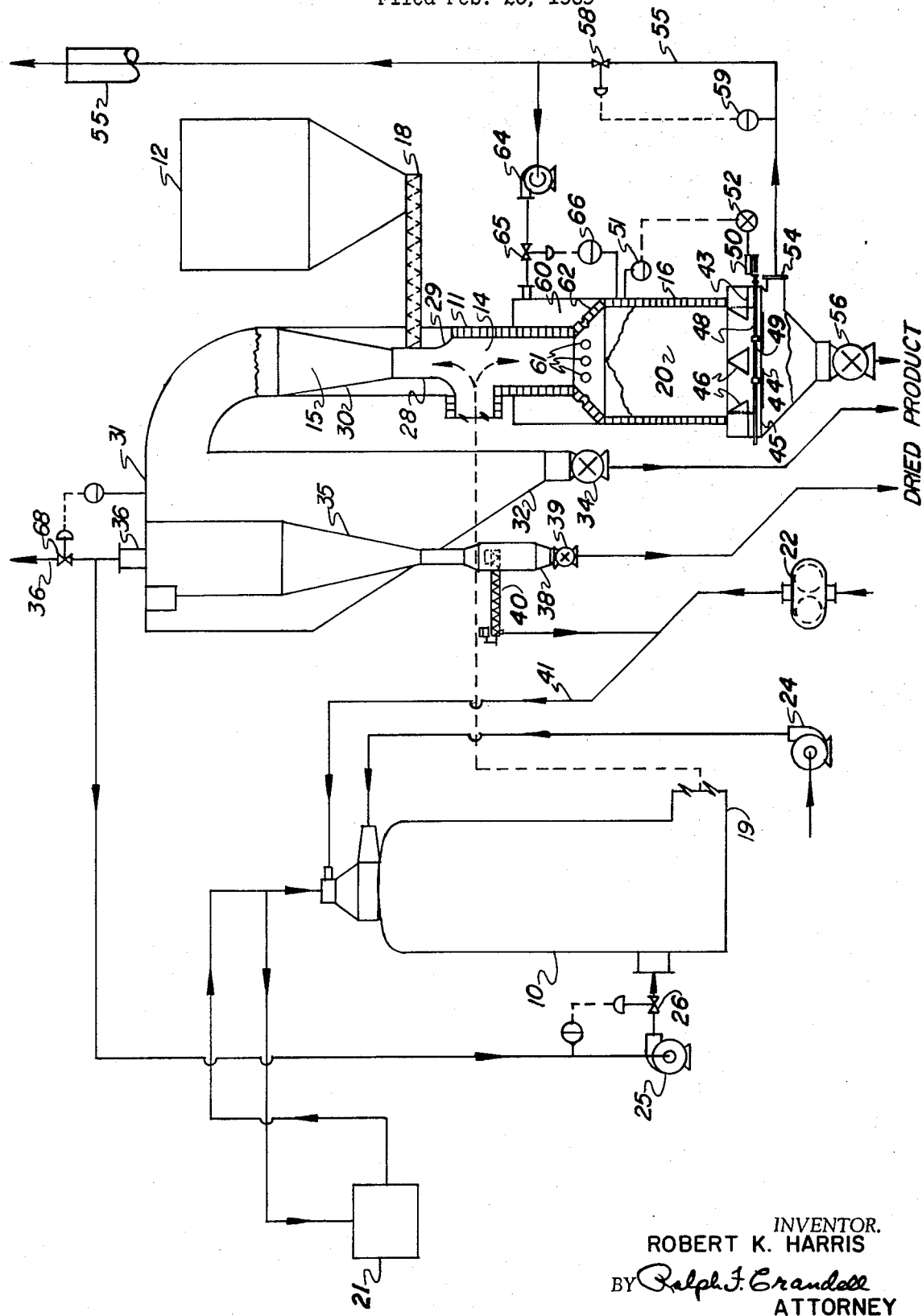
INVENTOR.
ROBERT K. HARRIS
BY Ralph F. Crandell
ATTORNEY //United States Patent Office 3,537,188
Patented Nov. 3, 1970

3,537,188
DRYER
Robert K. Harris, Littleton, Colo., assignor, by mesne assignments, to Mintech Corporation, a corporation of Colorado
Filed Feb. 25, 1969, Ser. No. 801,948
Int. Cl. F26b 17/10
U.S. Cl. 34—57                               4 Claims

ABSTRACT OF THE DISCLOSURE

An apparatus for drying heterogeneously sized particulated solid materials. The apparatus embodies a dryer unit composed of an upright entrained solids drying column, a vertical shaft kiln, having a discharge grate in its lower end, and a feed and separation column connecting the bottom of said upright drying column with the top of the vertical kiln. Hot gases are supplied to the feed and separation column from a furnace, while particulate solid materials are fed from a hopper to the lower end of the entrained solids drying column. A portion of the solids are entrained in the hot gases and the balance of the solids, being the larger size particles, are collected in the kiln and dried by a downward flow of hot gases. Dried solids are collected from the upper end of the entrained solids column and from the lower end of the kiln.

BACKGROUND OF THE INVENTION

The field of the invention is that of dryers for particulate solid materials. More particularly, the invention relates to an apparatus for drying particulate solid materials utilizing a combined hot gas entrained solids drying column, a feed and separation column, and a vertical shaft kiln.

Fluidized or suspended drying is a well known process for drying low cost wet solids. In such processes, wet solids are suspended and dried in high velocity hot gases. A combustion furnace provides hot gases of combustion which are directed, at a relatively high velocity, into the bottom of an upright entrained solids drying column. Wet coal or other material to be dried is suspended in the rising gas and, as the coal dries, it becomes lighter and is carried out of the chamber with the gas into a separator where the product is separated from the spent drying gas. This process and apparatus is limited to use with particulate solid materials having a particle size of approximately ¾ inch or less.

Various methods and apparatus for carrying out fluidized bed drying of solids have been disclosed in the prior art. Illustrative of the prior art disclosures are U.S. Pat. No. 2,666,269, issued Jan. 19, 1954, to V. F. Parry, for "Method of Drying Solids in a Fluidized Bed"; U.S. Pat No. 2,763,478, issued Sept. 18, 1956, to V. F. Parry for "Apparatus for Drying Solids in a Fluidized Bed"; U.S. Pat. No. 2,770,052, issued Nov. 13, 1956, to R. L. Morrison for "Method and Apparatus for Drying Treatment of Solids in The Fluidized or Gas Entrained State"; U.S. Pat. No. 2,773,018, issued Dec. 4, 1956, to V. F. Parry for "Continuous Process for Drying, Preheating, and Devolatilization of Carbonaceous Materials"; U.S. Pat. No. 2,795,860, issued June 18, 1957, to J. C. Wright et al. for "Method and Apparatus for Fluidized Drying"; U.S. Pat. No. 2,825,147, issued Mar. 4, 1958, to H. F. Silver for "Compact Dryer"; U.S. Pat. No. 2,833,055, issued May 6, 1958, to J. C. Wright for "Apparatus and Method of Fluidized Drying of Carbonaceous Fuels"; and U.S. Pat. No. 2,847,766, issued Aug. 19, 1958, to H. F. Silver for "Drier." To the extent necessary for a clear and complete understanding of fluidized bed drying of solids, the disclosure of each of the foregoing patents is incorporated by reference herein. Basically, the process involves drying combustible solids with hot gases by feeding particulate solids materials having a maximum particulate solid materials having a maximum particle size between approximately ⅛ and ½ inch, into a stream of the hot gases and thereby entraining the solids in the gas by restricting the diameter of the offtake to increase the velocity of the gas. The apparatus includes a furnace for producing the hot gases and a heat transfer chamber in which the solids are introduced into a stream of the hot gas. The heat transfer chamber includes an offtake of smaller diameter than the heat transfer chamber so that the solids are entrained in the gas. Dried solids are separated from the gas in appropriate cyclone type separators.

Kilns and furnaces adapted to accommodate a continuous gravity-induced flow of particulate solid material in exposure to fluids such as gases have long been known and utilized for the processing and treatment of many specific substances. Appropriately styled shaft kilns, such structures are widely used in many industrial applications. The downward flow of the particulate solids through the kiln is conventionally controlled by discharge grate mechanisms. An illustrative kiln and discharge grate mechanism is shown in U.S. Pat. No. 3,027,147, issued Mar. 27, 1962, to L. H. Brakel, et al. for "Circular Shaft Kiln Discharge Grate." To the extent necessary for an understanding of such kilns and discharge grates, the disclosure of the foregoing patent is incorporated by reference herein.

For efficient fluidized bed drying of solids, the particle size of the particulate solid materials being dried cannot, as a matter of practical efficiency, exceed approximately ½ to ¾ inch. On the other hand for drying in a vertical kiln of furnace, if the particle sizes are too small, the drying gases tend to channel and the drying is inefficient. For many low value high bulk materials, such as low rank coals, it becomes impractical from a material handling standpoint to effect preliminary separations prior to drying. Thus, where the particulate solid material to be dried is homogeneously sized in a range less than ½ inch, the material may be efficiently dried in a fluidized bed dryer. On the other hand, where the particulate solid material is homogeneously sized of a size greater than ¾ inch in diameter, a vertical shaft kiln dryer is appropriately qualified. Problems are encountered however where the particulate solid material is composed of heterogeneously sized materials ranging from particle sizes less than ½ inch in diameter to those greater than ¾ inch in diameter.

OBJECTS OF THE INVENTION

It is an object of the present invention to provide an efficient apparatus for drying heterogeneously sized particulate solid materials.

It is a related object to provide an apparatus of the foregoing character which, in addition to performing the necessary drying operation, will effect a separation of the solid particles into groups of larger and smaller sized particles.

Still another object of the present invention is to provide an apparatus of the foregoing character which will continuously dry or otherwise treat the particulate solid materials with the drying stages being carried out at a rate which is a function of the particle size.

SUMMARY OF THE INVENTION

The foregoing objects and advantages are accomplished by the provision of an apparatus for drying heterogeneously sized particulate solids material by contacting such material with hot gases supplied from a furnace. The solids material is fed to a three zone dryer unit comprising an upright entrained solids drying column, a vertical shaft kiln, and a feed and separation column connecting the bottom of the upright drying column with the top of the vertical kiln. The upright drying column is provided with a relatively small throat section at the bottom thereof opening upwardly into an entrainment section or column. The solids material is fed into the throat where is is contacted by a stream of hot gases rising at a high velocity through the entrainment column. This stream of gases entrains the smaller particles, while the larger particles fall through the stream of gases and are collected as a bed in the kiln. A portion of the hot gases from the furnace flows downwardly through the bed in the kiln to dry the particles therein.

The entrained particles are separated from the gases in appropriate separators and cyclones. Dried particles from the kiln are discharged through a discharge grate and collected as a finished product. Exhaust gases from the kiln may be recycled to the upper portion of the kiln to control the kiln gas temperature. Stack gases are also recycled to the furnace to temper the furnace gases and control the temperature of hot gases fed to the dryer unit.

The dryer unit performs both drying and separating functions and produces a particulate solids material product dried to the desired moisture content.

DESCRIPTION OF THE DRAWING

The single figure of the drawing is a generally schematic side elevational view of an assembly including in partial section a dryer unit embodying the present invention.

DESCRIPTION OF THE PREFERRED EMBODIMENT

In the drying system embodying the present invention, a high gas volume furnace 10 supplies hot drying gases to the dryer unit 11. A supply of wet particulate solid-feed material is supplied to the dryer unit 11 from a hopper 12. The dryer unit includes three parts of zones, a central feed and separation zone or chamber 14, an upper entrained solids drying column 15, and a lower moving bed vertical kiln 16. Solids are fed from the hopper 12 to the lower portion of the upper entrained solids drying chamber 15 by a screw conveyor 18. The gases are fed from the furnace 10 through a gas conduit 19 to the upper portion of the feed and separation chamber 14. The solids fed from the hopper 12 are directed into the lower portion of the entrained solids drying zone and fall into the rising hot gases. The smaller particles, ranging from dust particles to particulate solids approximately ¾ inch in diameter, are entrained and dried in the upper entrained solids drying column 15. Larger particles, those being approxiamtely ¾ inch in diameter and larger fall through the incoming hot gases into a bed 20 of particles in the vertical shaft kiln 16 and are dried by a downward flow of gases through the bed. The particle size range for the entrained solids drying column is limited to particles of approximately ¾ inch in diameter, although some larger particles may possibly be entrained, depending upon the specific gravity and surface characteristics of the solids being dried. The larger particles, including some slightly smaller ones, will fall into the kiln 16 where they will be dried by a flow of the heated furnace gases. The particle size separation is accomplished in the central or feed and separation chamber 14 so that a preliminary separation of the wet material from the hopper 12 prior to introduction into the drying unit 11 is not required. The use of such heterogeneously sized partcicular solid materials has an added advantage in that the larger particles prevent, to some extent, the clumping or compacting of the smaller particles.

The furnace 10 produces hot gases in the temperature range of between 2000° and 3000° Fahrenheit. These gases are tempered with recycle gas from the dryer unit 11 to a temperature of 1200°–1900° F. The tempered drying gases are fed through a duct 19 to the upper portion of the central feed and separation zone or column 14. The furnace is fired with a mixture of fuel oil from a fuel oil supply tank 21 and primary air from a primary air blower 22. An additional draft is provided by a forced-draft fan 24. The furnace gases are tempered by recycling stack gases from the drier unit 11 by means of a recycle fan 25 and control valve 26. Where the drying process produces combustible fuel dust, fuel dust is fed into the primary air supply line as will be described in more detail below.

In the dryer unit 11, the hot gases are fed into the central feed and separation zone 14. Surmounting this zone, the entrained solids drying chamber 15 has a restricted throat 28 at its lower end opening into the feed chamber 14. The entrance portion of the throat is rounded as at 29 to provide for smoother air flow. The wet solids from the hopper 12 are fed into the constricted throat and this throat may include vanes or baffles (not shown) as described in the prior art. The throat is relatively small compared to the upper section 30 of the entrainment column and compared to the diameter of the feed and separation zone 14. The upper section 30 may be an inverted cone shaped chamber, as shown in the drawing, or any other appropriate configuration. The gases flowing through the throat 28 have a considerably higher velocity than the gases in the main body of the dryer, so that they pick up the particles of wet solids and entrain them for drying. The wet particles, being suspended or fluidized in the hot gases, are dried and pass upwardly out of the entrained solids drying column into a separator unit 31. The separator unit, being of a considerably larger volume than the dry column, slows the gas flow so that the larger heavier dried particles drop out of the gas stream and are collected as a finished product. These particles are collected in a chamber or hopper 32 and discharged by a pressure retaining valve 34 such as a star wheel.

The drying gases, which will still contain some suspended dust particles, are then fed into a cyclone separator 35 in which the dust particles are removed from the gas and the gases pass out of the process through the stack 36. The dust is collected in a dust hopper 38 and may be discharged through a star wheel 39 as a dried product.

Where the solids being dried are combustible, the dust is ideally suited for use as an addition fuel in the furnace. To this end, a variable speed feed screw 40 supplies the fuel dust to the primary air line 41 from the primary air blower 22. The dust is carried into the furnace 10 and burned to produce additional hot gases.

The larger size wet particles fed into the feed and separation one 14 from the hopper 12 fall downwardly in contact with the hot gases and are collected as a bed 20 in the vertical shaft kiln 16. The vertical shaft kiln 16 is a conventional kiln and includes an appropriate discharge grate 43 for controlling the downward flow of solids through the kiln. An illustrative kiln and discharge grate mechanism is shown in above-identified U.S. Pat No. 3,027,147. The grate mechanism 43 is composed of a fixed structure which obstructs the lower end of the kiln so as to retain the bed of solid particulate material, and a complementary moveable structure which coacts with the fixed structure to discharge the solid material. The fixed structure comprises a coplanar array of retarder plates 44 defining throats 45, and a plurality of deflectors 46 disposed above the throats in overhanging spacedly adjacent relation with the retarder plates 44.

For purposes of dislodging and discharging solids material accumulated on the retarder plates 44 through the throats 45, there is provided a pusher bar structure 48 positioned intermediate the retarder plates 44 and the deflectors 46. The pusher bar structure includes pusher members 49 closely overlying the retarder plates 44 for pushing solids material off of the plates 44. The pusher bar structure is driven by an appropriate motor or motors 50 mounted externally of the kiln and oscillates or reciprocates to move the pusher members 49 back and forth over the retarder plates 44. The operation of the grate is controlled as a function of the level of the bed of solids material 20. The bed level in the kiln in turn is a function of the proportion of larger size particulate solid materials which are being fed into the drying unit 11 from the hopper 12. Accordingly, an appropriate level control 51 is provided which functions through a control 52 to vary the speed of drive motors 50 for the discharge grate 43.

Hot gases from the furnace 10 pass through the feed and separation chamber 14 downwardly through the solids material being dried in the bed 20. A gas exhaust port 54 is provided in the bottom of the kiln 16 and leads to a stack 55. The gases are cooled as they pass through the wet material in the bed 20 to effect a drying operation. Dried material is discharged from the bottom of the kiln 16 through a pressure control valve such as a star wheel 56 and is either mixed with the other dried material from the separator 31 and cyclone 35 or is collected separately as a finished product.

The temperature of the kiln 16 is controlled both by controlling the flow of gases through the kiln and by tempering the incoming gases with recycle gas. The flow of stack gases are controlled by a temperature controlled valve 58 operated by a controller 59 as a function of the stack gas temperature. Recycle gas is admitted to the kiln 16 through a plenum chamber 60 on the top of the kiln, and ports 61 in the upper kiln wall 62. The recycle gas functions to control the temperature of the gas contacting the moist material at the top of the kiln bed 20, while the exhaust gas temperature from the kiln is controlled by adjusting the flow of stack gases. A recycle blower 64 is utilized to feed recycle gas from the stack 55 into the plenum chamber 60 and thence into the upper portion of the kiln 16. This recycle gas flow is controlled by a valve 65 and temperature controller 66. Stack gas flow from the separator 31 and cyclone 35 through stack 36 is controlled by a valve 68. The relative flow of stack gases and recycle gases can be controlled, and the kiln temperature can be adjusted according to the moisture content and type of material being dried. The flow of drying gases from the furnace is further controlled by controlling both the kiln stack flow and the separator stack flow as well as by controlling the recycle gas to the furnace itself.

The dryer unit not only performs a drying operation on the wet particulate product, but also effects a separation of the inlet feed material. The present invention thus provides an improvement in drying apparatus as well as an improved method of drying and separating wet particulate solid materials. The unit eliminates the necessity for a screening operation prior to drying and has the further advantage of enabling the utilization of fine particulate dried produce as a fuel for use in producing hot gases for drying the relatively coarser materials. At the same time, the apparatus produces an automatic size separation.

While one illustrative method and apparatus embodying the present invention has been shown in the drawings and described above in particular detail, various modifications, alternative constructions, equivalents, and uses of the present invention will doubtless occur to those skilled in the art.

I claim as my invention:

1. An apparatus for drying heterogeneously sized particulate solids material by contacting said material with hot gases, comprising in combination, an upright entrained solids drying column, a vertical shaft kiln, and a feed and separation column connecting the bottom of said upright dry column with the top of said vertical kiln, said upright drying column having a relatively small throat section at the bottom thereof opening upwardly into an entrainment section and opening downwardly into said feed and separation column, said vertical shaft kiln opening at its upper end into said feed and separation column, feed means extending into said throat for feeding particulate solids material into the apparatus, furnace means for supplying hot gases to said feed and separation column at a point intermediate said upright drying column and said kiln wherein a portion of said gases flow upwardly through said throat at a relative high velocity in contact with said solids material introduced therein to entrain the relatively smaller solid particles thereof in a rising high velocity stream of drying gases, the remaining portion of said particulate solid material falls through said feed and separation column in contact with said hot gases into a bed of soild material in said kiln, and the remaining portion of said hot gases flows downwardly through a bed of the relatively larger solid particles collected in said kiln, a discharge grate means in the lower end of said kiln for regulating and controlling the discharge of solids material from said kiln, separating means for collecting entrained solid materials from said rising high velocity gas stream, means for regulating and controlling the discharge of drying gas from the bottom of said kiln, and means for supplying recycled discharge gas from the bottom of said kiln to the upper end of said kiln for controlling the temperature of drying gases in said kiln, whereby said particulate solids material is dried to the desired moisture content.

2. A drying apparatus for drying heterogeneously sized particulate solid materials by contacting said materials with hot gases, comprising in combination, an upright entrained solids drying column, a vertical shaft kiln having a discharge grate in its lower end, and a feed and separation column connecting the bottom of said upright drying column with the top of said vertical kiln, said upright drying column having a relatively small throat section at the bottom thereof opening upwardly into an entrainment section and opening downwardly into said feed and separation column, said vertical shaft kiln opening at its upper end into said feed and separation column, feed means extending into said throat for feeding particulate solids material into the apparatus, and furnace means for supplying hot gases to said feed and separation column at a point intermediate said upright drying column and said kiln, whereby a portion of said gases flows upwardly through said throat at a relative high velocity in contact with said solids material introduced therein to entrain the relatively smaller solid particles thereof in a rising high velocity stream of drying gases, the remaining portion of said particulate solid material falls through said feed and separation column in contact with said hot gases into a bed of solid material in said kiln and the remaining portion of said hot gases flows downwardly through a bed of the relatively larger solid particles collected in said kiln.

3. A drying apparatus as claimed in claim 2 including means for regulating and controlling the discharge of drying gas from the bottom of the kiln, and means for recycling a portion of the gas from the bottom of the kiln to the upper portion of the kiln for controlling the kiln gas temperature.

4. A drying apparatus as claimed in claim 2 including a plenum chamber on the upper portion of the kiln communicating with the interior of said kiln through ports defined in the upper walls thereof, and means for recycling kiln stack gases to said plenum chamber for controlling the gas temperature in the upper portion of said kiln.

References Cited

UNITED STATES PATENTS

| | | | |
|---|---|---|---|
| 2,450,843 | 10/1948 | Sherman | 34—57 |
| 3,118,658 | 1/1964 | Dennert | 263—21 |

FOREIGN PATENTS 108,013  7/1943  Sweden.

FREDERICK L. MATTESON, JR., Primary Examiner

R. A. DUA, Assistant Examiner

PO-1050
(5/69)

UNITED STATES PATENT OFFICE
CERTIFICATE OF CORRECTION

Patent No. 3,537,188                 Dated November 3, 1970

Inventor(s) R. K. Harris

It is certified that error appears in the above-identified patent and that said Letters Patent are hereby corrected as shown below:

Column 1, line 14 before "solid" change "lated"
        to --late--.

Column 2, beginning on line 11 after "maximum" and
        continuing onto line 12 delete "particulate solid
        materials having a maximum";
        line 44 change "of" to --or--.

Column 3, line 57, change "of" to --or--.

Column 4, line 9, after "wet" insert --solid--;
        line 48 after "up" insert a hyphen (-);
        line 51 change "dry" to --drying--;
        line 65 change "addition" to --additional--;
        line 71 change "one" to --zone--.

Column 5, line 75 change "produce" to --product--.

Column 6, line 15 change "dry" to --drying--.

SIGNED AND
SEALED
JAN 5 1971

(SEAL)
Attest:

Edward M. Fletcher, Jr.
Attesting Officer

WILLIAM E. SCHUYLER, JR.
Commissioner of Patents